United States Patent
Heiman et al.

(10) Patent No.: US 7,854,434 B2
(45) Date of Patent: Dec. 21, 2010

(54) RING SEAL WITH AXIALLY-OPPOSED RADIALLY-OFFSET SEAL BEADS

(75) Inventors: Timothy D. Heiman, Warsaw, IN (US); William J. Laule, Grosse Pointe Farms, MI (US); James R. Osborne, Davisburg, MI (US); Darron G. Peddle, Millersburg, IN (US); Michael R. Rivenburgh, Clarkston, MI (US)

(73) Assignees: TI Group Automotive Systems, L.L.C., Warren, MI (US); Parker Hannifin Corporation, Cleveland, OH (US)

( * ) Notice: Subject to any disclaimer, the term of this patent is extended or adjusted under 35 U.S.C. 154(b) by 477 days.

(21) Appl. No.: 11/846,944

(22) Filed: Aug. 29, 2007

(65) Prior Publication Data

US 2008/0252020 A1     Oct. 16, 2008

Related U.S. Application Data

(60) Provisional application No. 60/911,299, filed on Apr. 12, 2007, provisional application No. 60/941,143, filed on May 31, 2007.

(51) Int. Cl.
    *F16J 15/12*     (2006.01)
(52) U.S. Cl. .................. 277/644; 277/628; 277/651
(58) Field of Classification Search .......... 277/628, 277/630, 644, 651; 220/378
    See application file for complete search history.

(56) References Cited

U.S. PATENT DOCUMENTS

| | | | |
|---|---|---|---|
| 3,467,448 A | 9/1969 | Galle | |
| 3,519,279 A * | 7/1970 | Wagner | ................. 411/542 |
| 3,606,357 A | 9/1971 | Yonkers | |
| 3,788,654 A | 1/1974 | Mandley | |
| 3,918,726 A | 11/1975 | Kramer | |
| 4,248,439 A | 2/1981 | Haslett | |
| 4,262,914 A | 4/1981 | Roley | |
| 4,280,390 A * | 7/1981 | Murray | ................. 411/542 |
| 4,311,317 A * | 1/1982 | Bartels | ................. 220/304 |
| 4,344,629 A | 8/1982 | Oelke | |
| 4,364,572 A | 12/1982 | Yamamoto et al. | |
| 4,426,091 A | 1/1984 | Baylor | |
| 4,568,090 A | 2/1986 | Westemeier | |

(Continued)

FOREIGN PATENT DOCUMENTS

JP     2004278622     10/2004

(Continued)

OTHER PUBLICATIONS

Drawing—TI Group Automotive Systems Seal—CAM Lock Model Year 2003.

*Primary Examiner*—Vishal Patel
*Assistant Examiner*—Robert E Fuller
(74) *Attorney, Agent, or Firm*—Reising Ethington P.C.

(57) ABSTRACT

A ring seal includes a sealing ring including an asymmetric body portion having axially-opposed and radially-offset seal beads. The ring seal may also include a reinforcement ring carried at least partially in the sealing ring to distribute load across the seal beads. The ring seal may further include a skirt depending generally axially from the body portion and defining an inner diameter of the sealing ring and preferably having frusto-conical cross-sectional shape.

13 Claims, 4 Drawing Sheets

U.S. PATENT DOCUMENTS

| | | | |
|---|---|---|---|
| 4,712,802 A * | 12/1987 | Hewison et al. | 411/542 |
| 4,813,690 A | 3/1989 | Coburn, Jr. | |
| 5,201,625 A * | 4/1993 | Takenouchi et al. | 411/369 |
| 5,234,039 A | 8/1993 | Aoshima et al. | |
| 5,265,890 A | 11/1993 | Balsells | |
| 5,330,068 A | 7/1994 | Duhaime et al. | |
| 5,409,337 A * | 4/1995 | Muyskens et al. | 411/148 |
| 5,860,680 A | 1/1999 | Drijver et al. | |
| 5,879,010 A | 3/1999 | Nilkanth et al. | |
| 5,913,441 A | 6/1999 | Voirol | |
| 5,944,323 A | 8/1999 | Cavka | |
| 6,012,904 A | 1/2000 | Tuckey | |
| 6,091,175 A | 7/2000 | Kinsinger | |
| 6,305,483 B1 | 10/2001 | Portwood | |
| 6,332,555 B1 | 12/2001 | Stangier | |
| 6,357,618 B1 | 3/2002 | Kloess et al. | |
| 6,357,759 B1 | 3/2002 | Azuma et al. | |
| 6,357,760 B1 | 3/2002 | Doyle | |
| 6,419,236 B1 | 7/2002 | Janian | |
| 6,450,502 B1 | 9/2002 | Baehl et al. | |
| 6,497,415 B2 | 12/2002 | Castleman et al. | |
| 6,502,826 B1 | 1/2003 | Schroeder et al. | |
| 6,533,288 B1 | 3/2003 | Brandner et al. | |
| 6,691,888 B2 | 2/2004 | Moser et al. | |
| 6,698,613 B2 | 3/2004 | Goto et al. | |
| 6,755,422 B2 | 6/2004 | Potter | |
| 6,854,739 B2 | 2/2005 | Schleth et al. | |
| 7,134,671 B2 | 11/2006 | Duke et al. | |
| 7,140,617 B2 | 11/2006 | Popielas et al. | |
| 7,204,218 B2 * | 4/2007 | vom Stein | 123/90.38 |
| 2002/0017527 A1 | 2/2002 | Goto et al. | |
| 2002/0053769 A1 | 5/2002 | Oiarbide Aseguinolaza | |
| 2002/0158419 A1 | 10/2002 | Zitting et al. | |
| 2004/0239047 A1 | 12/2004 | Kent et al. | |

FOREIGN PATENT DOCUMENTS

| | | |
|---|---|---|
| JP | 2005016651 | 1/2005 |

* cited by examiner

FIG_ 7
PRIOR ART

FIG_ 8
PRIOR ART

RING SEAL WITH AXIALLY-OPPOSED RADIALLY-OFFSET SEAL BEADS

CROSS-REFERENCE TO RELATED APPLICATIONS

This application claims the benefit of U.S. Provisional Applications Nos. 60/911,299 filed Apr. 12, 2007, and 60/941,143 filed May 31, 2007.

FIELD OF THE INVENTION

This invention relates generally to seals, and more particularly to ring seals of particular cross-sectional shape and construction.

BACKGROUND OF THE INVENTION

Automotive fuel system seals include polymeric, deformable components that are widely used in many different applications to make a pressure-tight joint between parts, and typically include ring-shaped axial seals and radial seals or O-rings. In use, radial seals are compressed in a radial direction perpendicular to a seal centerline on opposed radially inside and outside surfaces of the radial seal's cross section, whereas axial seals are compressed in an axial direction parallel to a seal centerline on axially opposed surfaces of the axial seal's cross section.

Axial seals are widely used to seal openings of containers. For example, axial seals are often used to seal an opening in a fuel tank and are disposed in a flange-type joint between a mounting flange of a fuel delivery module and an outer surface of the fuel tank.

SUMMARY OF THE INVENTION

One form of a ring seal includes a sealing ring including an asymmetric body portion having axially-opposed radially-offset seal beads. The ring seal may also include a reinforcement ring carried at least partially in the sealing ring to distribute load across the seal beads. The ring seal may further include a skirt depending generally axially from the body portion and defining an inner diameter of the sealing ring and preferably a frusto-conical cross-sectional shape.

According to another form, a reinforced ring seal includes a relatively flexible outer ring including a body portion having, in an uncompressed state, an asymmetric cross-sectional shape defined by axially-opposed and radially-offset seal beads. The ring seal also includes a relatively rigid inner ring disposed at least partially in the outer ring to distribute load across the seal beads.

According to yet another form, a ring seal is compressible axially between a first component having a first radial wall and a second component having a second radial wall, wherein at least one of the components include an axial wall adjacent the radial wall thereof. The ring seal includes a sealing ring with a body portion and a skirt portion extending generally axially from the body portion and having a portion contactable with the axial wall of the at least one of the components and defining an inner diameter of the ring seal. The body portion includes a first sealing surface between the inner and outer diameters and having a first seal bead contactable with the first radially extending wall, and a second sealing surface generally axially opposite of the first sealing surface and having a second seal bead contactable with the second radially extending wall and radially offset from the first seal bead.

At least some of the objects, features and advantages that may be achieved by at least certain forms of the invention include providing a seal that is readily adaptable to various sealing applications including axial seals in sealed joints between fuel tanks and fuel modules; resists rolling during assembly; and is of relatively simple design and economical manufacture and assembly, durable, reliable and in service has a long useful life.

Of course, other objects, features and advantages will be apparent in view of this disclosure to those skilled in the art. Various other seals and sealing applications embodying the invention may achieve more or less than the noted objects, features or advantages.

BRIEF DESCRIPTION OF THE DRAWINGS

These and other objects, features and advantages of the present invention will be apparent from the following detailed description of the preferred forms and best mode, appended claims, and accompanying drawings in which:

DETAILED DESCRIPTION OF THE PREFERRED FORMS

In general, and before referring to the drawing figures, various exemplary forms of a ring seal are described. The various exemplary forms may be used in any desired application, but are all particularly well-adapted for a flange joint of a fuel tank assembly of an automobile, or a fuel tank of any number of recreational, marine, industrial, garden, and/or agricultural products.

Figure 1:
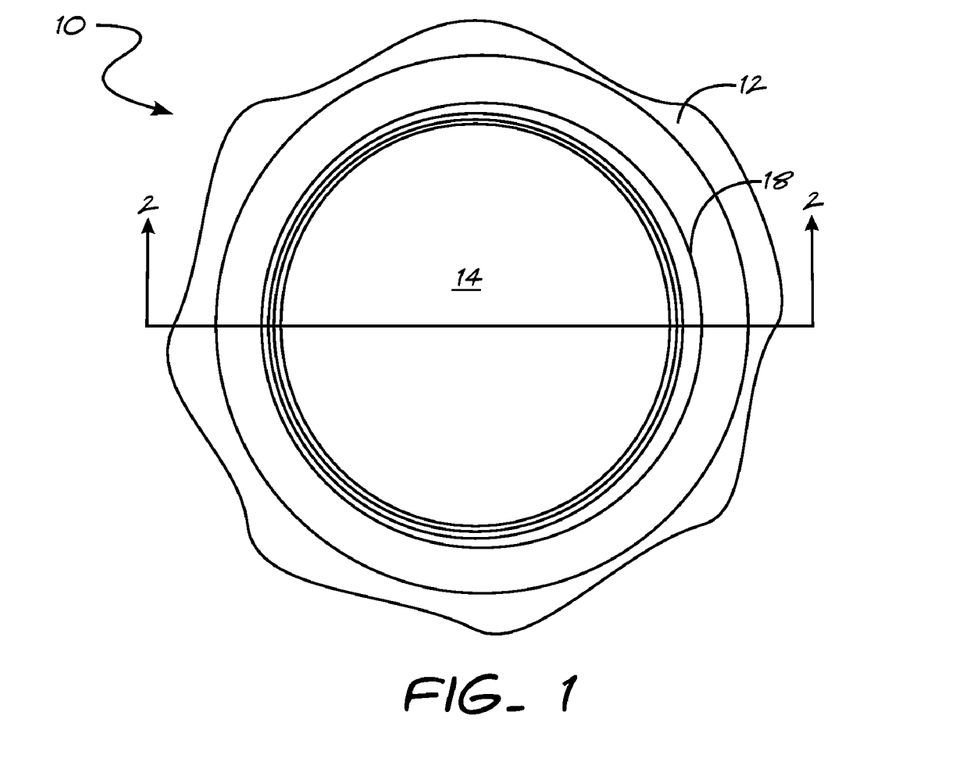
FIG. 1 is a fragmented top view of a fuel tank assembly including a fuel tank and a plug assembled thereto.
Figure 2:
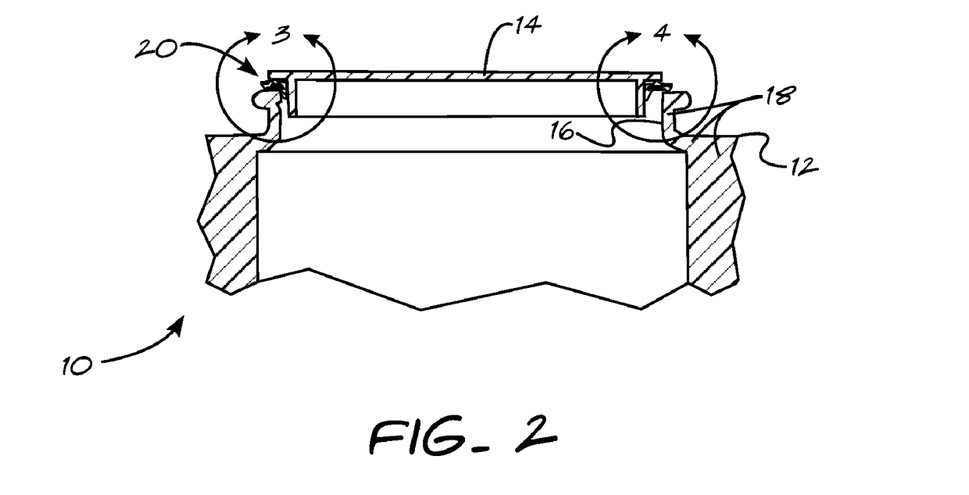
FIG. 2 is a cross-sectional view of the fuel tank assembly of FIG. 1 taken along line 2-2 thereof, and including an exemplary first form of a ring seal between a flange of the plug and a wall of the fuel tank to define a sealed joint.

Referring in detail to the drawings, FIGS. 1 and 2 illustrate a vessel assembly such as a fuel tank assembly 10 that stores fuel and includes a vessel or a fuel tank 12 for housing fluid such as fuel and a plug 14 mounted to the fuel tank 12 at an opening 16 (FIG. 2) through a fuel tank wall 18. The plug may be any component, such as a mounting "flange" of a fuel delivery module or a fuel filler pipe (not shown). The plug 14 may be mounted or positioned adjacent or against the fuel tank wall 18 wherein the plug 14 may be mounted and attached to the fuel tank 12 in any suitable manner, such as described in U.S. patent application Ser. No. 11/361,399, which is assigned to the assignee hereof and is incorporated by reference herein in its entirety.

Fuel within the fuel tank 12 may be composed of highly volatile hydrocarbons that may quickly vaporize and escape to the atmosphere through the flange-type joint between the plug 14 and fuel tank 12, if the joint is not suitably sealed. As shown in FIG. 2, the plug 14 may not always align concentrically with the opening 16 of the fuel tank 14, and may result in uneven radial spacing therebetween. Nonetheless, it may be desirable to provide a pressure-tight flange-type joint between the plug 14 and the fuel tank 12, with an exemplary axial seal 20, as more specifically shown in FIGS. 3 and 4.

Figure 3:
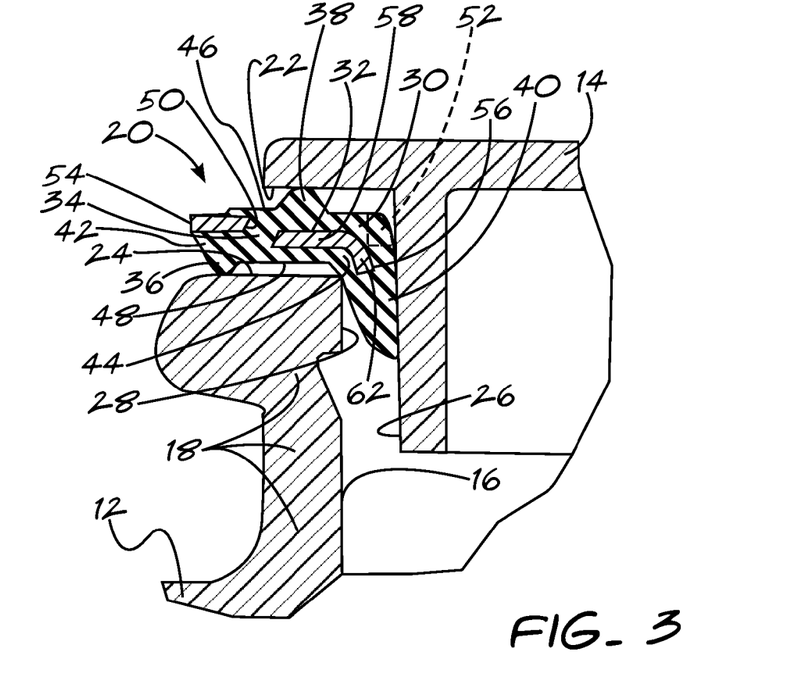
FIG. 3 is an enlarged, fragmentary view of circle 3 of the sealed joint of FIG. 2.
Figure 4:
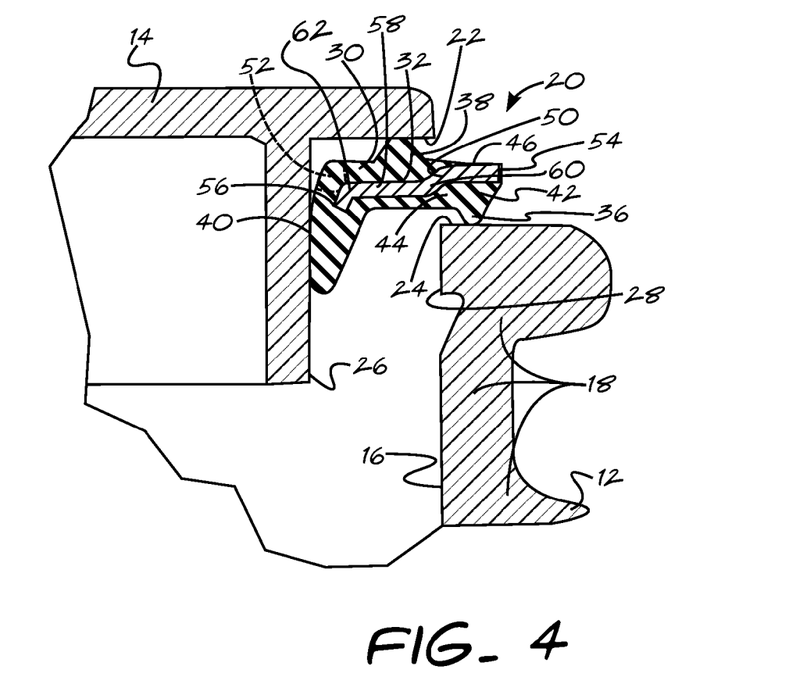
FIG. 4 is an enlarged, fragmentary view of circle 4 of the sealed joint of FIG. 2.

FIGS. 3 and 4 illustrate, in cross section, the seal 20 of FIG. 2. In assembly, the seal 20 generally may be disposed at the opening 16 and may be disposed between a radially extending wall 22 of the plug 14 and a radially extending wall 24 of the tank 12, and between an axially extending wall 26 of the plug 14 and an axially extending wall 28 of the tank 12. In other words, the plug 14 is mounted to the fuel tank 12 at the opening 16 and has a flange 22 mounted adjacent the wall 24 of the fuel tank 14, wherein the flange 22 and the wall 24 of the fuel tank define a joint comprising an axial gap. Accordingly, the seal 20 generally may be a "face seal" or "flange seal." The plug 14 may be inserted into the opening 16 until the axial wall 26 of the plug 14 fits in the opening 16 and the radial wall 22 of the plug 14 may be positioned adjacent the radial wall 24 of the fuel tank 14 to at least partially cover the seal 20, such that the seal 20 may be between and in sealingly resilient contact with the plug 14 and the fuel tank 12 to provide fluid-tight sealing therebetween.

The seal 20 may be preferably substantially annular, ring-shaped, or circumferentially continuous, and includes an outer or resilient sealing ring 30 and may also include an inner relatively stiff or rigid reinforcement ring 32, which may be embedded or carried at least partially in the sealing ring 30. The rings 30, 32 are generally circular in shape.

The sealing ring 30 may be generally circumferentially continuous and may have, in a relaxed or an uncompressed state, a generally radially planar body portion 34 having, at least in an uncompressed state, an asymmetrical cross-sectional shape (in cross section as shown in FIGS. 3 and 4). The shape may be defined by seal beads 36, 38 that are axially-opposed and radially offset from one another and preferably of substantially similar or the same height. Unlike prior art seals, where seal beads are of symmetrical shape in cross-section, here the beads 36, 38 are intentionally oriented in an asymmetrically-opposed fashion.

The body portion 34 may also include a radially outward portion 42, a radially inward portion 44, an axially outboard (outer or top) sealing surface 46, and an axially inboard (inner or bottom) sealing surface 48. The body portion 34 may further include a first or axially inboard seal bead 36 that may be contiguous with the inboard sealing surface 48, and a second or axially outboard seal bead 38 that may be contiguous with the outboard sealing surface 46 and that is disposed radially inwardly of the first seal bead 36.

The sealing ring 30 may also include a skirt 40 depending generally axially from the body portion 34. The skirt 40 may generally depend in an axially inward direction from the inboard sealing surface 48 at the radially inward portion 44 of the body 34 and may define an inner diameter of the seal 20. The skirt 40 may also generally depend radially inwardly to define a preferably generally frusto-conical cross-sectional shape of a radially inner portion of the seal 20. In its uncompressed state the minimum inside diameter of the seal 20 is preferably smaller than the outside diameter of the wall 26 of the plug so that in assembly the skirt is received on the wall 26 with an interference fit providing sealing engagement therewith. The seal 20 may be pre-assembled to the plug 14, such that the skirt 40 frictionally engages the radial wall 26 of the plug 14 before the plug 14 is assembled to the tank 12. Accordingly, the seal 20 may be skirt-mounted to the plug 14 to maintain concentricity of the seal 20 to the plug 14.

The reinforcement ring 32 may be generally circumferentially continuous except perhaps for one or more flow holes 50 and/or chaplet reliefs 52. The reinforcement ring 32 may be generally planar in shape with one or more bends. For example, the reinforcement ring 32 may include a radially outer peripheral portion 54, a radially inner peripheral portion 56, and at least one planar portion 58 therebetween.

The reinforcement ring 32 may also include at least one bend 60 (FIG. 4) located generally between the offset sealing beads 36, 38 and may additionally include a radially inward bend 62 and lip at the inner peripheral portion 56. The radially inward bend 62 may provide some additional rigidity to the reinforcement ring 32 and, thus, to the seal 20. The other bend 60 may also provide rigidity, and may also provide an elevational step in the reinforcement ring 32 to help distribute force from the radially inward seal bead 38, through the sealing and reinforcement members 30, 32, to the radially outward bead 36. The reinforcement ring 32 may further include the one or more flow holes 50 therein or therethrough to promote mechanical interconnection between the sealing and reinforcement members 30, 32. The reinforcement ring 32 may provide an anti-twisting or anti-rolling feature to enable the seal 20 to resist twisting or rolling when the plug 14 may be assembled to and tightened down against the tank 12.

Again, as shown in the section of FIG. 2, the plug 14 may not assemble concentrically to the opening 16 of the fuel tank 12. In other words, the outer diameter of the axial wall 26 of the plug 14 may not be concentric with the inner diameter of the axial wall 28 of the fuel tank 12 at the opening 16. Accordingly, a radial gap between the plug 14 and the fuel tank 12 may not be uniform, as best shown by the fragmentary sections of FIGS. 3 and 4. Between FIGS. 3 and 4, it can be seen that the second seal bead 38 may be substantially concentric with respect to the plug axial wall 26, but that the first seal bead 36 may be non-concentric with respect to the tank axial wall 28. As shown in FIG. 3 there may be greater radial overlap of the first seal bead 36 with respect to the inboard radial wall surface 24 of the tank 12, whereas in FIG. 4 there may be lesser radial overlap of the first seal bead 36 with respect to the inboard radial wall surface 24 of the tank 12.

Because of the offset seal beads 36, 38 and/or the reinforcement ring 32 to help carry or distribute load therebetween, the ring seal 20 does not roll or fall into the tank opening 16 when the plug 14 is assembled to the tank 12. For example, when an axially oriented load is applied to the plug 14, the load may be distributed from the seal bead 38 through the body portion 34 and a portion of the reinforcement ring 32 to the other seal bead 36 as it compresses against the fuel tank 12.

The seal 20 may be of any suitable size depending upon the size of the gaps between the plug 14 and the tank 12 and the application in which the seal 20 is to be used, and the seal 20 may be composed of any suitable material. In particular, the sealing ring 30 may be composed of a relatively flexible and preferably resilient material such as a thermoplastic, an elastomer, or a composite of a thermoplastic and an elastomer. In one specific example, the sealing ring 30 may be composed of a relatively high-performance vapor-permeation-resistant polymer such as Viton® (available from DuPont Dow Elastomers of Wilmington, Del.), or the like, with a relatively high FKM fluorocarbon content. In another specific example, the sealing ring 30 may be at least partially comprised of a bisphenol cured fluorocarbon rubber such as VW252-65 available from Parker Engineered Seals Division, a subsidiary of Parker Hannifin Corporation. Alternatively, the sealing ring 30 may be composed of any liquid-fuel-resistant elastomer, for example, a nitrile elastomer, fluoro-silicone rubber, butylene-nitrol elastomer, or a lower FKM content elastomer. The material may contain ⅔ or more FKM with an approximate coefficient of friction of 0.25.

The seal 20 may provide improved low temperature sealing capability, for example, by 10 to 20° C. Typically, a seal's low temperature sealing range is determined by the material of the seal. For example, some sealing member material may only provide limited cold-temperature elasticity capability, e.g. to as low as about −15 degrees F., but the reinforcement ring 32 may also be provided to compensate for this relatively low cold-temperature elasticity performance of the sealing ring 30. In other words, the reinforcement ring 32 may be used as an energizer to provide the seal 20 with added torsional stiffness enabling the seal 20 to maintain enough sealing force to adequately seal at a lower temperature than is typical for the sealing material alone.

The reinforcement ring 32 may be composed of any relatively rigid material such as any suitable metal, polymer, or composite. More specifically, the reinforcement ring 32 may be composed of 410S, spring tempered stainless steel. The reinforcement ring 32 instead may be composed of a zinc-plated plain carbon steel, or of a relatively rigid polymer material, including any suitable thermosetting material or Nylon® with or without a glass or mineral filler up to approximately 60% glass filled. Fillers may be applicable to any engineered polymer. Other materials may include PPA, PPS, Ultim, or other engineered polymers suitably formulated to provide sufficient rigidity of the ring 32 for the particular sealing application.

The reinforcement ring 32 may provide a load-bearing strata in the composition of the seal 20 to transfer loading across the offset sealing beads. One or more bends in the reinforcement ring 32 may provide additional cross-sectional strength to the ring 32 in resisting bending moments of the seal 20 due to the offset sealing beads. If a metallic ring is used, additional ring post-forming processes such as spring tempering, case hardening, annealing, and/or other suitable processes may be applied in order to increase the rigidity of the ring 32 to resist compressive loading failure over time. In any case, the reinforcement ring 32 is relatively rigid in contrast to the relatively flexible sealing ring 30.

The ring seal 20 may be manufactured by any suitable method. For example, the sealing ring 30 may be partially or entirely co-molded (or co-injection molded) with the reinforcement ring 32, partially or entirely over-molded (or insert-molded) to the reinforcement ring 32, or partially or entirely molded according to any other suitable molding method. Generally, however, co-molding and over-molding methods are well known to those of ordinary skill in the art. If co-molding, over-molding, or like methods are used, it may be desirable that the polymer used to form the sealing ring 30 be compatible with, and capable of adhering to, the material used to form the reinforcement ring 32. Alternatively, the reinforcement ring 32 first may be produced such as by stamping, injection molding, or any other processes, and the sealing ring 30 may be assembled and/or adhered to the reinforcement ring 32 in a subsequent manufacturing step. In another form, an adhesive, appropriate to an elastomer compound used in the sealing ring 30, may be applied via, spray, dip or other coating processes to the reinforcement ring 32.

For use in fuel systems, the polymeric materials may exhibit suitable resistance to degradation and swelling when in contact with hydrocarbon fuels such as gasoline, gasohol, alcohol, diesel, and the like. The phrase polymeric material generally means relatively high-molecular-weight materials of either synthetic or natural origin and may include thermosets, thermoplastics, and/or elastomers. The term elastomeric generally means a material, which at room temperature, can be stretched under low stress to greater than its original length or more and, upon release of the stress, will return with force to its approximate original length. Elastomeric also encompasses any of various elastic substances resembling rubber, such as a fluorocarbon like Viton®, a nitrile such as acrylonitrile-butadiene, or the like. In general, the materials used for the components may be selected based on their dimensional stability and resistance to swelling and degradation in warm and cold flexible hydrocarbon fuel environments.

Figure 5:
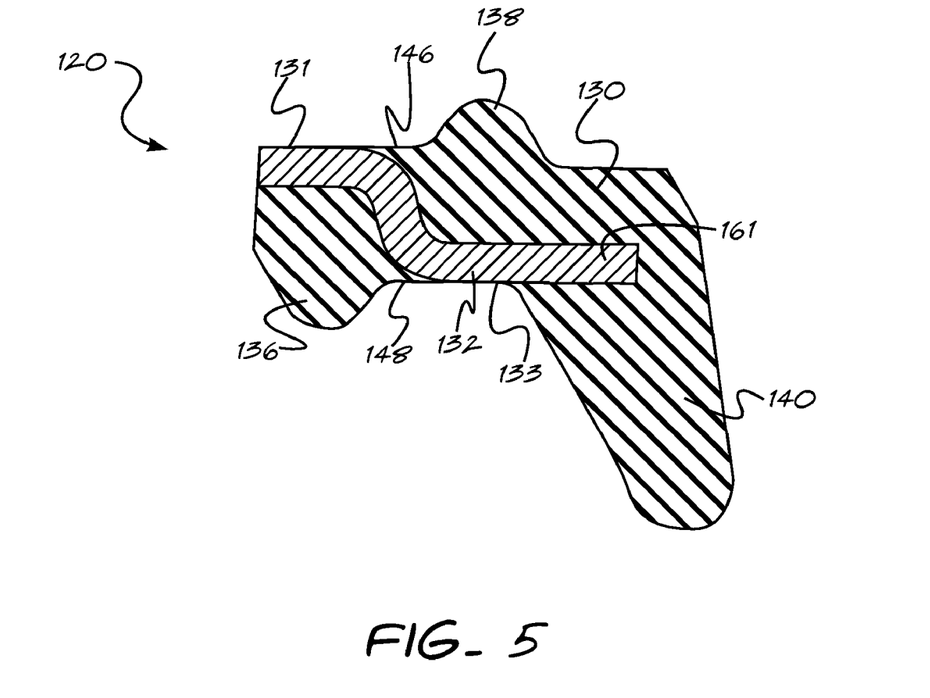
FIG. 5 is an enlarged, fragmentary view of another form of a ring seal.

FIG. 5 illustrates another presently preferred form of a ring seal 120. This embodiment is similar in many respects to the form of FIGS. 1 through 4 and like numerals between the forms generally designate like or corresponding elements throughout the several views of the drawing figures. Additionally, the descriptions of the forms are incorporated by reference into one another and the common subject matter may generally not be repeated here.

In this form, the ring seal 120 includes a sealing member 130 substantially similar to that of the previous form, but includes a somewhat different reinforcement member 132. Unlike the previous form, wherein the reinforcement ring 32 was disposed generally between the sealing surfaces 46, 48 of the sealing ring 30, here the reinforcement member 132 includes axially outboard and inboard surfaces 131, 133 that may be contiguous with corresponding sealing surfaces 146, 148. Also, the reinforcement member 132 may be straight at a radially inward end 161 instead of bent. The seal 120 may include a first seal bead 136, a second, radially offset or asymmetrically-opposed second seal bead 138, and a skirt 140.

Figure 6:
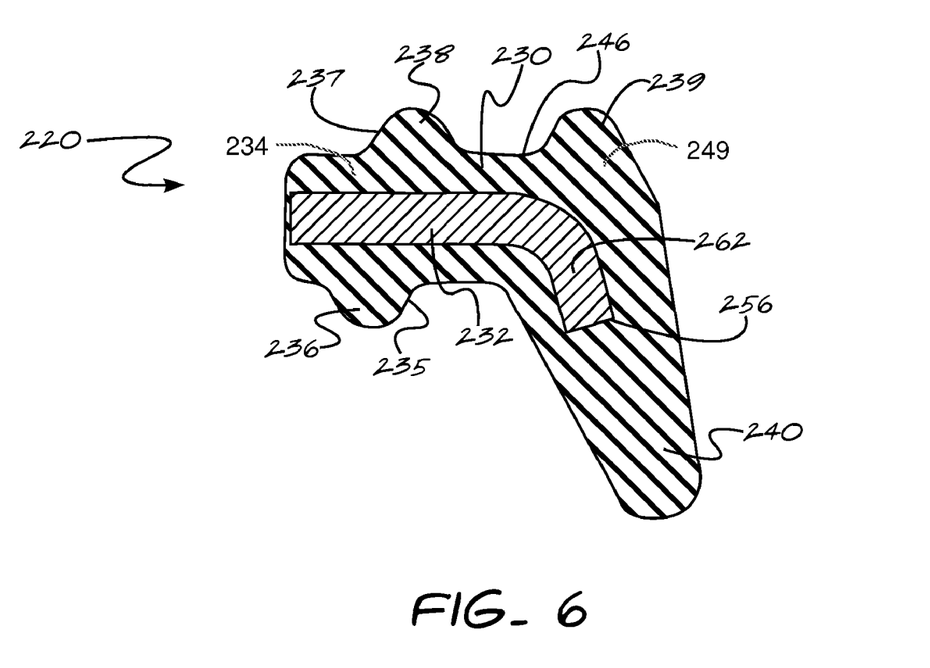
FIG. 6 is an enlarged, fragmentary view of yet another form of a ring seal.

FIG. 6 illustrates another presently preferred form of a ring seal 220. This embodiment is similar in many respects to the forms of FIGS. 1 through 5 and like numerals between the forms generally designate like or corresponding elements throughout the several views of the drawing figures. Additionally, the descriptions of the forms are incorporated by reference into one another and the common subject matter may generally not be repeated here.

In this form, the ring seal 220 includes a sealing member 230 with a third seal bead 239 contiguous with an axially outboard sealing surface 246 and positioned substantially at a radially inward end 249 of a body portion 234. Also, first and second seal beads 236, 238 may be spaced relatively closer together or partially overlapping such that a radially inward slope 235 of the first seal bead 236 radially overlaps a radially outward slope 237 of the second seal bead 238. The ring seal 220 also includes a reinforcement member 232 that may be substantially flat except for a bent radially inward portion 262 that defines a radially inner peripheral portion 256 of the reinforcement member 232 and extends partially within a skirt 240.

Figure 7:
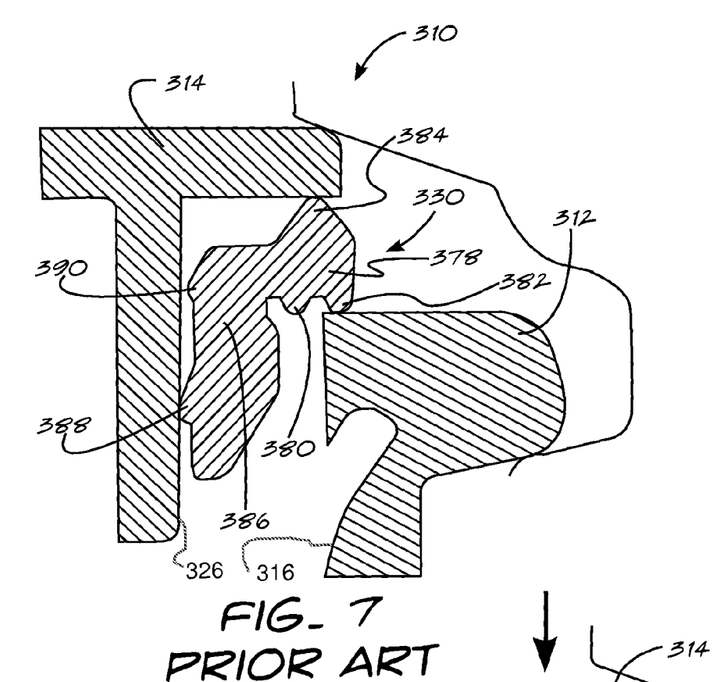
FIG. 7 is a cross-sectional view of a portion of a prior art sealed flange joint showing a ring seal with a substantially symmetrical radial portion, just before a plug is pressed into an opening of a fuel tank.
Figure 8:
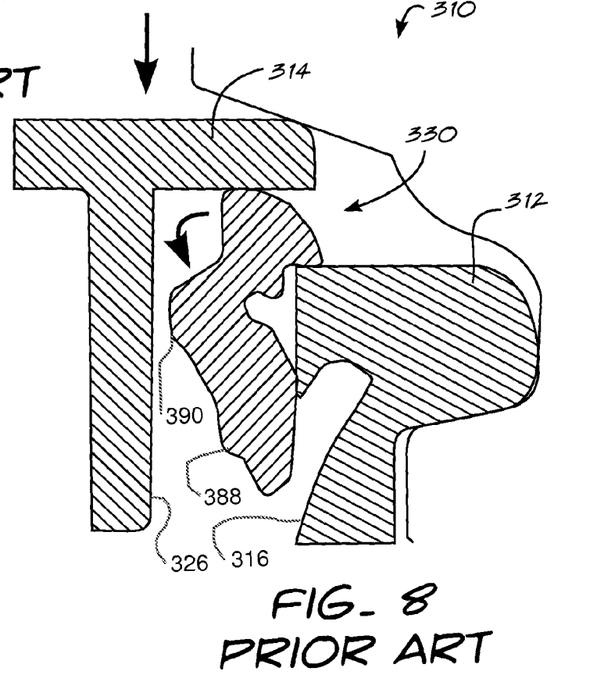
FIG. 8 is a cross-sectional view of a portion of the prior art sealed flange joint of FIG. 7 showing the ring seal being rolled into the opening as the plug is being pressed toward the fuel tank.

FIGS. 7 and 8 illustrate a prior art sealed flange joint 310 including a polymeric ring seal 330 with a substantially symmetrical seal portion 378. FIG. 7 illustrates the joint just before a plug 314 is pressed into an opening of a fuel tank 312. The symmetrical portion 378 includes symmetrically opposed seal beads including axially inboard seal beads 380, 382 and an axially outboard seal bead 384 generally radially centered between the beads 380 and 382. The seal 330 also includes a skirt 386 that depends substantially straight axially downward from the symmetrical portion 378 or, in other words, is disposed at a substantially right angle with respect to the symmetrical portion 378. The skirt 386 also includes axially spaced apart and radially projecting seal beads 388, 390 to seal against an axial wall 326 of the plug 314. FIG. 8 shows the ring seal 330 being rolled into the opening 316 between the plug 314 and tank 312 as the plug 314 is being pressed toward the fuel tank 312 to compress the seal between them.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. A ring seal comprising:
 a sealing ring including an asymmetric body portion having, in an uncompressed state, axially-opposed and radially-offset seal beads, a radially outward portion, a radially inward portion, an axially outboard sealing surface, and an axially inboard sealing surface axially spaced apart from and opposite said axially outboard sealing surface, wherein the seal beads include an axially inboard seal bead contiguous with the axially inboard sealing surface and an axially outboard seal bead contiguous with the axially outboard sealing surface and disposed radially inwardly of the axially inboard seal bead;
 the sealing ring also including a frustoconical skirt extending axially away from the axially inboard sealing surface at the radially inward portion of the body portion and extending radially inwardly from the axially inboard sealing surface to define an inner diameter of the sealing ring; and
 a reinforcement ring carried at least partially in the sealing ring to distribute load across the seal beads, and including a radially outer peripheral portion, a radially inner peripheral portion, a first planar portion between the radially outer and inner peripheral portions, a second planar portion between the radially outer and inner peripheral portions and completely embedded in the sealing ring, a bend between the first and second planar portions and radially between the seal beads of the sealing ring and completely embedded in the sealing ring, and a frustoconical bend at the radially inner peripheral portion and completely embedded in the sealing ring.

2. The ring seal of claim 1 wherein the skirt is composed of a flexible material and the skirt maintains concentricity of the ring seal with respect to a component when assembled to a component.

3. The ring seal of claim 1 wherein the reinforcement ring includes at least one flow hole into which material from the sealing ring may extend and form a mechanical lock therebetween.

4. The ring seal of claim 1, wherein the sealing ring is composed of a relatively flexible material and the reinforcement ring is composed of a relatively rigid material.

5. The ring seal of claim 4, wherein the sealing ring is composed of a polymeric material including at least one of a thermoplastic material, an elastomeric material, or a composite of a thermoplastic and an elastomeric material, and wherein the reinforcement ring is composed of at least one of a metal or a rigid polymer.

6. The ring seal of claim 5 wherein the sealing ring is composed of a bisphenol cured fluorocarbon rubber and the reinforcement ring is composed of stainless steel.

7. The ring seal of claim 1 wherein the sealing ring is over-molded to the reinforcement ring.

8. The ring seal of claim 1 wherein the sealing ring is assembled to the reinforcement ring.

9. The ring seal of claim 1 wherein the sealing ring includes a third seal bead contiguous with the outboard sealing surface and positioned substantially at a radially inward end of the body portion.

10. The ring seal of claim 9 wherein the axially-opposed and radially offset seal beads are overlappingly spaced such that a radially inward slope of one of the seal beads radially overlaps a radially outward slope of another of the seal beads.

11. A ring seal compressible axially between a first component having a first radial wall and a second component having a second radial wall, at least one of the components having an axial wall adjacent the radial wall thereof, comprising:
 a sealing ring including:
  a body portion having:
   a first sealing surface having a first seal bead contactable with the first radial wall; and
   a second sealing surface generally opposed to and axially spaced apart from the first axial sealing surface and having a second seal bead contactable with the second radial wall and radially offset from the first seal bead; and
  a skirt portion extending generally axially from the body portion and having a portion contactable with the axial wall of the at least one of the components and defining an inner diameter of the ring seal; and
 a reinforcement ring at least partially carried in the sealing ring to distribute load from one of the seal beads to the other through the body portion and including a first planar portion, a second planar portion disposed radially inwardly of the first planar portion and completely embedded in the sealing ring, a bend between the first and second planar portions and located radially between the seal beads of the sealing ring and completely embedded in the sealing ring, and a frustoconical bend at the radially inner peripheral portion and completely embedded in the sealing ring.

12. A ring seal comprising:
 a sealing ring including:
  a radially planar body having:
   a radially outward portion,
   a radially inward portion,
   an axially outboard surface,
   an axially inboard surface opposed to and axially spaced apart from said axially outboard surface, and
   axially opposed and radially offset seal beads including an axially inboard seal bead contiguous with the axially inboard surface, and an axially outboard seal bead contiguous with the axially outboard surface and disposed radially inwardly of the axially inboard seal bead and radially outwardly of the radially inward portion, and
  a frustoconical skirt extending from the radially inward portion of the radially planar body in an axially inboard direction and beyond the axially inboard seal bead and in a radially inward direction to define an inner diameter of the seal; and
 a reinforcement ring carried in the sealing ring and including: a radially outer peripheral portion; a radially inner peripheral portion;
  a radially inner planar portion disposed radially outwardly of the radially inner peripheral portion and embedded in the sealing ring;

a radially outer planar portion disposed radially inwardly of the radially outer peripheral portion;

a bend embedded in the sealing ring and disposed between the radially inner and outer planar portions to provide an axially offset elevational step in the reinforcement ring, and radially between the seal beads of the sealing ring, to resist bending moments in the seal due to the radially offset sealing beads and thereby resist seal rolling; and a frustoconical bend at the radially inner peripheral portion to rigidify the reinforcement ring.

13. The ring seal of claim 12 wherein the bend of the reinforcement ring includes at least one flow hole through which material from the sealing ring extends to form a mechanical lock to the reinforcement ring.

* * * * *